(No Model.)
J. RITZMAN.
BRACE FOR THRASHING MACHINES AND SEPARATORS.
No. 338,784. Patented Mar. 30, 1886.
Fig 1.
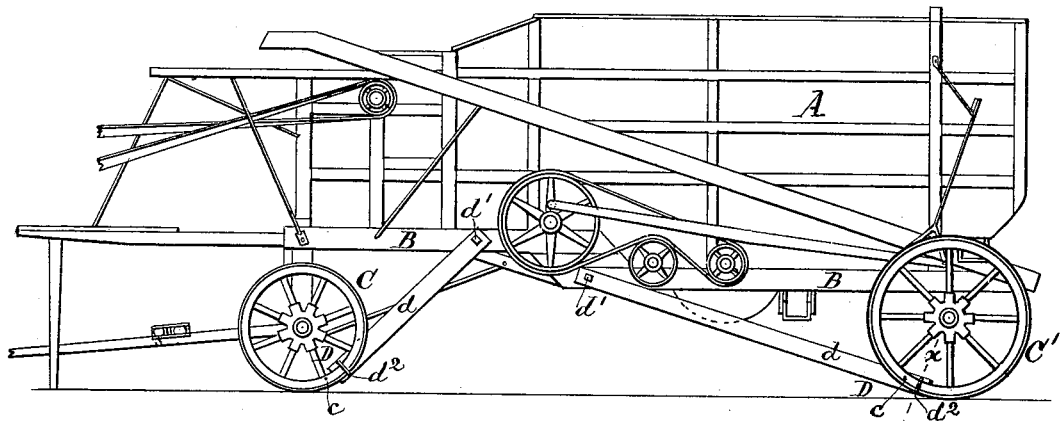
Fig 2.
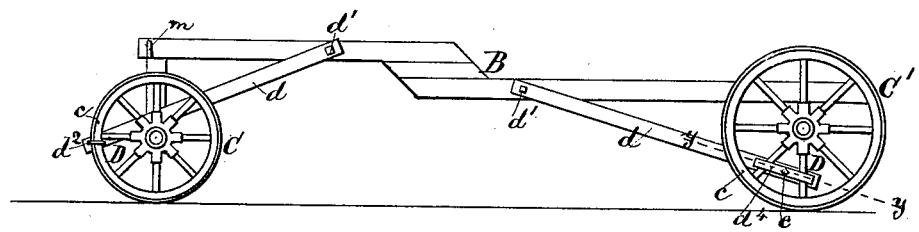
Fig 3. Fig 4.
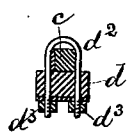 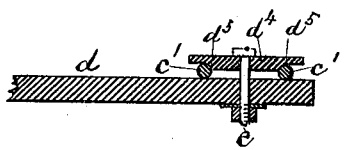
Witnesses:
Robt L Fenwick
C. W. Davis
Inventor:
Jackson Ritzman
by his Atty's
Mason, Fenwick & Lawrence

UNITED STATES PATENT OFFICE.

JACKSON RITZMAN, OF MADISON, BUTLER COUNTY, ASSIGNOR OF ONE-HALF TO THOMAS H. COBLE, OF FRANKLIN COUNTY, IOWA.

BRACE FOR THRASHING-MACHINES AND SEPARATORS.

SPECIFICATION forming part of Letters Patent No. 338,784, dated March 30, 1886.

Application filed October 12, 1885. Serial No. 179,660. (No model.)

*To all whom it may concern:*

Be it known that I, JACKSON RITZMAN, a citizen of the United States, residing in Madison township, in the county of Butler and State of Iowa, have invented certain new and useful Improvements in Braces for Thrashing-Machines and Separators; and I do hereby declare the following to be a full, clear, and exact description of the invention, such as will enable others skilled in the art to which it appertains to make and use the same.

My invention relates to braces applied between the frames or housings and the wheels of thrashing-machines, whereby the wheels are prevented from turning, and the machine is rendered stationary upon its wheels, while it is operated by a suitable motor.

In the accompanying drawings, Figure 1 is a side elevation of a thrashing-machine and separator having my invention applied to its front and rear wheels. Fig. 2 is a detail side view of the bottom frame and wheels of the said machine, provided with braces of modified construction. Fig. 3 is a section in the line $xx$ of Fig. 1, and Fig. 4 is a section in the line $yy$ of Fig. 2.

The letter A in the drawings designates the housing of a thrashing-machine and separator; B, its bottom frame; C C, the wheels, and D the braces. A bar, $d$, is firmly bolted at $d'$ to the bottom frame, B, or the housing A, its lower end being attached to the lower portion of the felly $c$ of the wheel by means of a U-shaped bolt, $d^2$, and nuts $d^3$. The bolt $d^2$ passes over the felly $c$ and through the bar $d$, so that when the nuts are drawn up tight it clamps the bar $d$ against the felly, and thus prevents the wheel from turning on its axle.

The thrashing-machine and separator may be provided with one or more of the braces D—one to each wheel, by preference—and when checked by said braces from moving will retain its position steadily while being operated in the field or other place.

One of the most common modes of steadying such machines consists in driving pins or pegs into the ground and tying the wheels thereto. In using this mode, the wheels, having a small amount of freedom for rolling, soon begin to rock, and jerk the pins or pegs loose, so that the retaining mechanism requires to be watched constantly and readjusted at short intervals of time. All this care and labor is avoided with my invention, and the machine remains steady during its operation, no matter how long this may continue.

The bar $d$, instead of being fastened to the lower portion of the wheel, may be fastened to the wheel above the axle, as shown in Fig. 3, and instead of being fastened to the felly it may be fastened to the spokes, as seen in Fig. 4. In the latter case a clamp-plate, $d^4$, may be used instead of the U-shaped bolt $d^2$, and this clamp-plate would be provided with shoulders $d^5$, fitted between the spokes $c'\,c'$, and the clamp-plate would by means of a bolt, $e$, be drawn tight upon the spokes, and thus the bar $d$ firmly clamped thereto.

Whichever of the described devices is employed for clamping or clipping the brace bar or bars $d$ to the wheels, the bars will serve the purpose mentioned—viz., steadying the machine while being operated.

When the machine is not in use, the braces can be rested on hooks, as at $m$ in Fig. 2. Similar hooks will be provided on different parts of the framing or housing of the machine, according to the requirements of the different braces used.

I am aware of Letters Patent Nos. 187,607, 180,738, and 34,551, and make no claim for anything therein shown and claimed.

My invention differs from known contrivances, in that it provides a detachable longitudinal brace for connecting the wheel with the frame and preventing the rotation back and forth of the wheel, and also obviating such racking of the wheel as might be incident to the form of longitudinal brace which merely connects the front and rear wheels on a side.

What I claim is—

1. The combination, with the frame A B and wheel C, of the detachable longitudinal brace D, comprising bar $d$, pivot-bolt $d'$, and the U-shaped clip-bolt $d^2$, having nuts $d^3$, substantially as and for the purpose described.

2. The combination, with frame A B and wheel C, of the detachable longitudinal brace D, comprising bar $d$, pivot-bolt $d'$, and the connecting and clipping devices, substantially as described, for firmly connecting the wheel and brace, substantially as and for the purpose set forth.

In testimony whereof I affix my signature in presence of two witnesses.

JACKSON RITZMAN.

Witnesses:
T. B. TAYLOR,
H. B. WEEKS.